Sept. 27, 1960 E. L. POTTS 2,953,919
PIPE TESTING APPARATUS
Filed Oct. 22, 1956 6 Sheets-Sheet 4

Ernest L. Potts
INVENTOR.

BY
ATTORNEY

Sept. 27, 1960  E. L. POTTS  2,953,919
PIPE TESTING APPARATUS
Filed Oct. 22, 1956  6 Sheets-Sheet 5

Fig. 6

Ernest L. Potts
INVENTOR.

BY

ATTORNEY

United States Patent Office 2,953,919
Patented Sept. 27, 1960

2,953,919

PIPE TESTING APPARATUS

Ernest L. Potts, Houston, Tex., assignor to
Cicero C. Brown, Houston, Tex.

Filed Oct. 22, 1956, Ser. No. 617,390

9 Claims. (Cl. 73—49.5)

This invention relates to apparatus for pressure testing pipe, particularly tubing such as used in oil wells.

In testing of tubing strings, the testing is usually performed while the pipe sections are being made up into the pipe string and lowered into the well. Conventional apparatus includes an elongate rod or body carrying spaced-apart seals by which a section of the pipe string is sealed off and water or other hydraulic fluids are then introduced between the seals in order to pressure-test the sealed-off pipe section.

As each section is thus tested, an additional pipe section is connected to the upper end of the string and the tool is then drawn upwardly in the extended pipe string to a point at which it may be employed to test the newly added section.

Conventional testing tools of this character employ rubber seals such as swab cups, and the like, which are in continuous frictional contact with the inner wall of the pipe string, this contact being increased by the pressure of the hydraulic testing fluid in order to tighten the seals for testing purposes. The repeated drawing of the tool upwardly in the pipe string as each section is added necessarily requires that the seal members be dragged over the pipe surfaces, since they are, as noted, ordinarily in frictional contact with the pipe wall at all times. The result of this dragging of the rubber seal elements over the pipe wall is that the seals are rapidly worn out and must be changed frequently during the testing of one string of pipe, particularly if it is of any substantial length. This is both time consuming and a source of additional, and sometimes excessive, cost.

The present invention has for its primary object the provision of an improved form of testing tool which obviates the principal disadvantages, such as those pointed out above, in existing tools.

An important object is the provision of a testing tool in which the primary seal elements have a normal diameter sufficiently less than the internal diameter of the pipe in which the tool is run to normally be out of substantial rubbing contact with the pipe wall and which are radially expandible to form the requisite seals, the sealing elements being retractable after each application of pressure.

A more specific object is to provide a pipe testing tool in which the seal elements include resilient annular seal members and compression members actuated by fluid pressure applied from inside the body of the tool to expand the seal members to form the desired seals.

Still another object is to provide a pipe testing tool having an elongate body carrying longitudinally spaced seal elements actuatable by fluid pressure to expand into sealing engagement with the wall of the pipe under test, there being a first pressure fluid supply conduit means extending through the body of the tool and communicating with both seal elements, and a second pressure fluid supply conduit means extending through the body and the upper seal member and opening into the space between the seal members.

Other and more specific objects and advantages of this invention will become more readily apparent from the following detailed description when read in conjunction with the accompanying drawing which illustrates a useful embodiment of a pipe testing tool in accordance with the present invention.

Figures 1, 2:
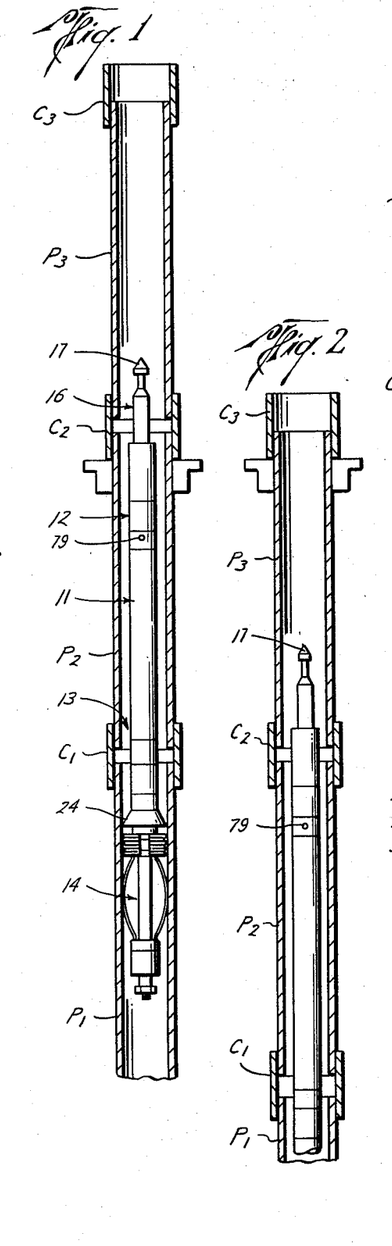
Figs. 1 to 4, inclusive, are diagrammatic views, showing the tool inside a string of pipe undergoing testing and illustrating several positions of the tool during its operation.

Referring to the drawings and more particularly to Fig. 1, the pipe testing tool in accordance with this invention comprises the elongate body, designated generally by the numeral 11, which includes upper and lower seal elements, designated respectively by the numerals 12 and 13, an anchor assembly, designated generally by the numeral 14, connected to the lower end of the body, and a downwardly facing cup seal 24 secured to the body between the lower seal element 13 and anchor assembly 14. The upper end of the body is connected to a head 16 carrying a spear 17 at its upper end adapted to be gripped by a conventional grappling device G for elevating the testing tool in a pipe string, which is illustrated in Fig. 1 as made up of the sections $P_1$, $P_2$ and $P_3$, the sections being connected by the collars $C_1$ and $C_2$.

Figures 5A, 5B:
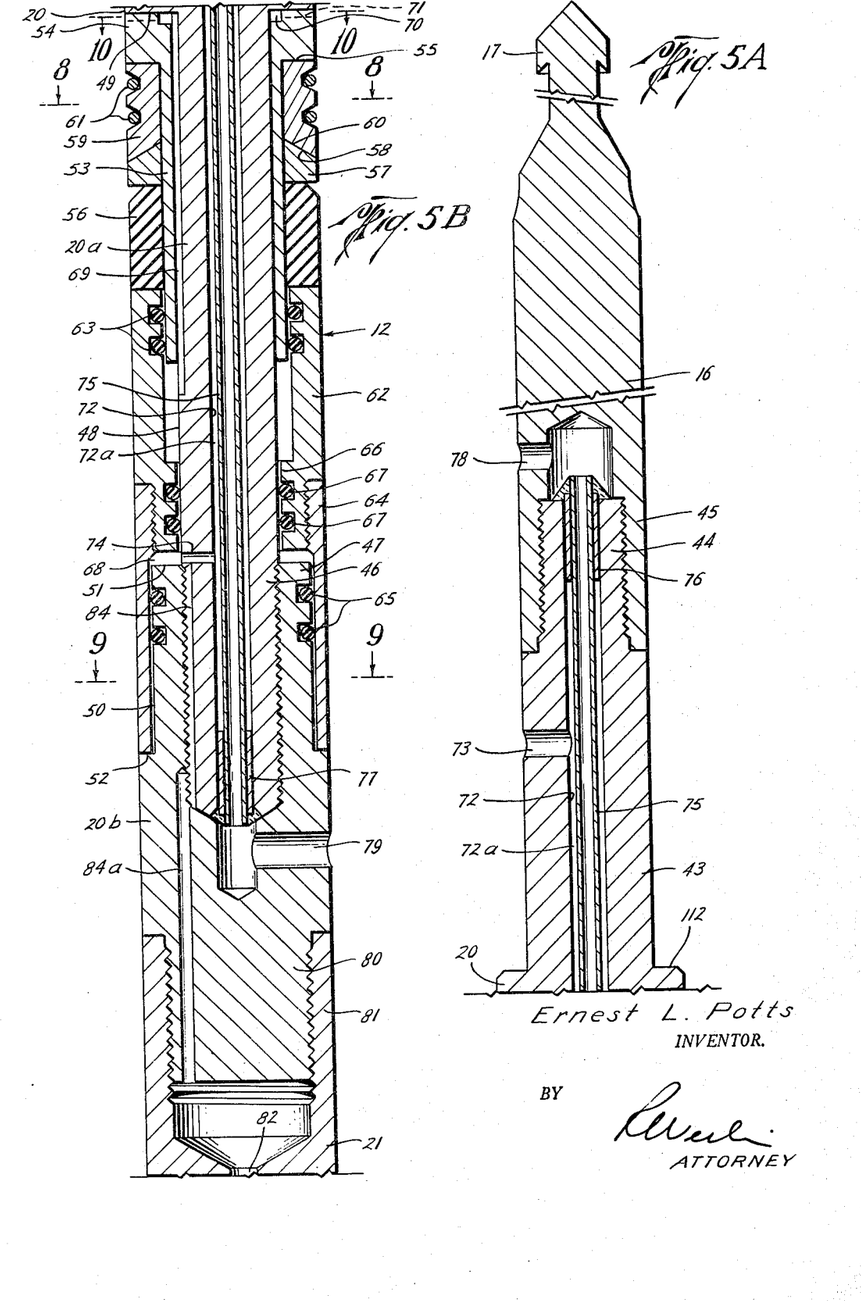
Figs. 5A to 5F, together, constitute a longitudinal sectional view of the pipe testing tool illustrating the position of the parts of the seal elements in their retracted or non-sealing positions.
Figures 5C, 5D:
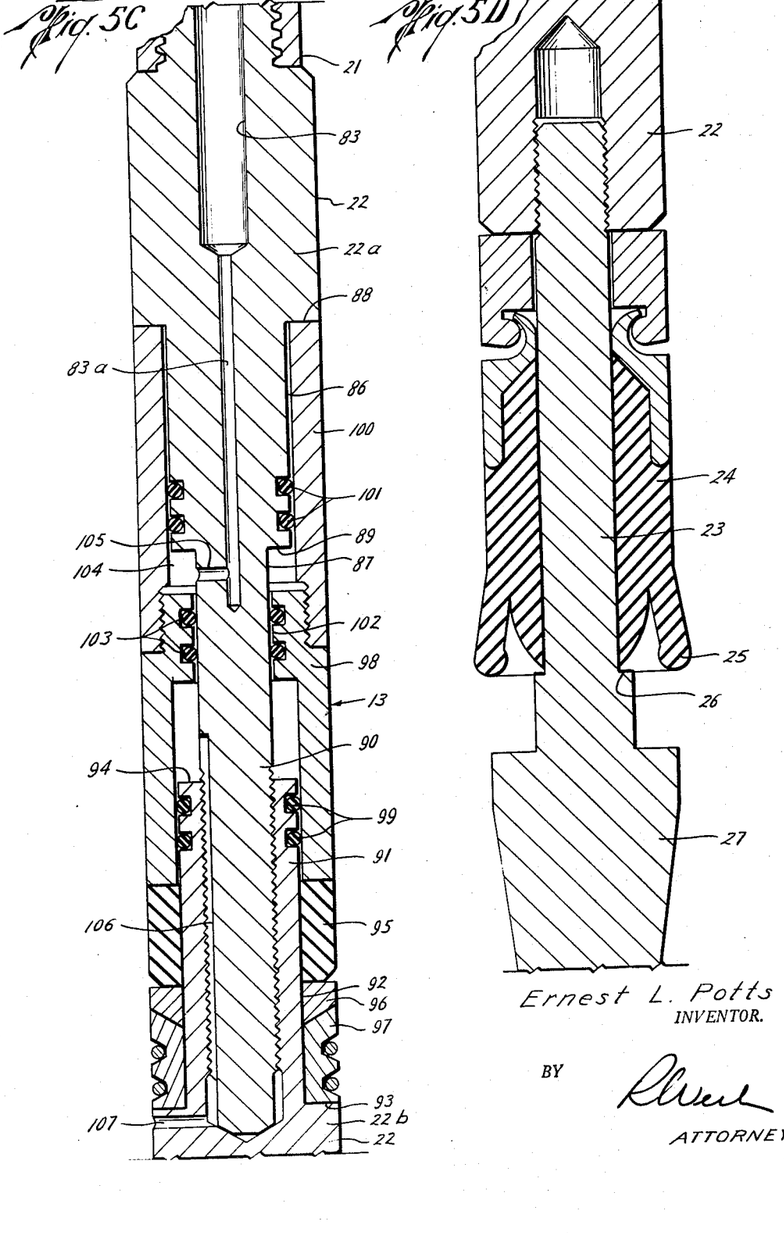
Figure 5E:
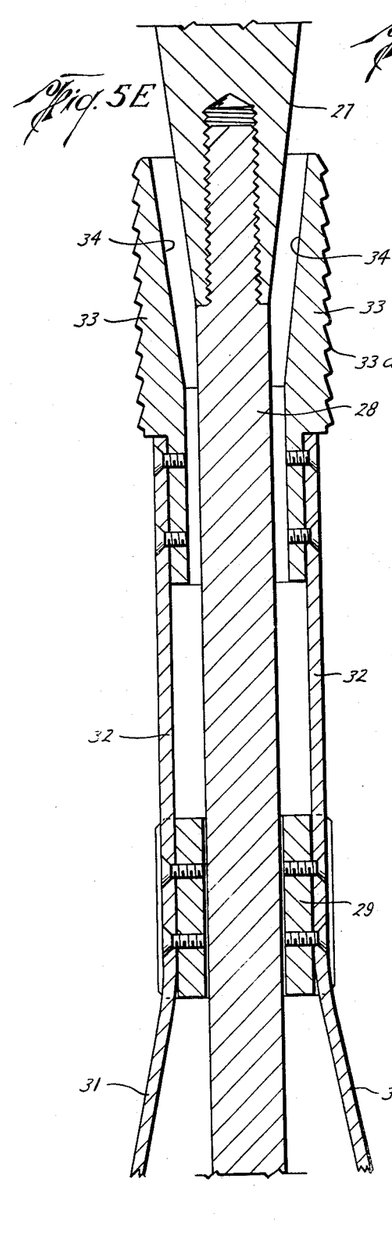
Figure 5F:
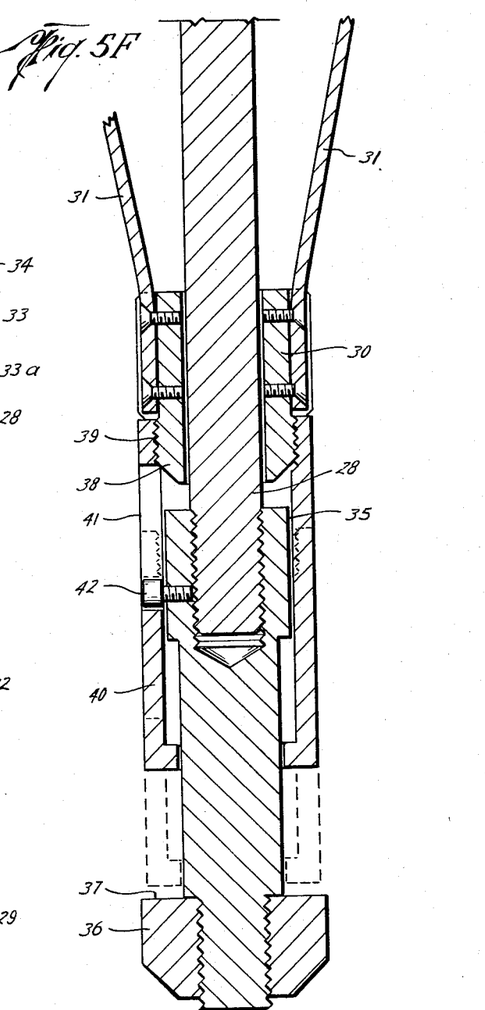

Referring now to Figs. 5A to 5F, inclusive, the testing tool includes an elongate body of generally cylindrical form made up of a series of interconnected sections which, beginning at the upper end of the tool, comprise an upper section 20 which carries the upper seal member 12, the extended connector section 21 which is, in turn, connected to a lower body section 22 on which is mounted the lower seal member 13. Secured to the lower end of lower body section 22 is a mandrel 23 on which is mounted a downwardly facing cup seal 24 of generally conventional form, constructed of rubber or other similar composition and having a downwardly and outwardly flaring lip or skirt 25. Cup seal 24 is held in position against the lower body section 22 by a shoulder 26 formed on mandrel 23. Mandrel 23 supports anchor assembly 14, which is of the generally conventional slip type. The anchor assembly includes a downwardly tapering slip expander cone 27, to the lower end of which is connected a stem 28 on which is slidably mounted spaced collars 29 and 30 interconnected by outwardly bent drag springs 31 adapted to normally frictionally engage the wall of the pipe in which the testing tool is run. Extending upwardly from upper collar 29 is a series of angularly spaced spring arms 32 to the upper ends of which are attached the pipe gripping slips 33 having teeth 33a on their outer faces and having tapered inner-faces 34 adapted to engage with the tapered surface of expander cone 27 in response to axial movement of the cone and slips toward one another. Spring arms 32 normally resist outward movement of the slips so that when out of engagement with cone 27 the slips will be held inwardly out of engagement with the pipe wall. The lower end of stem 28 has threadedly secured thereto a short extension 35 on the lower end of which is threaded a nut 36 providing an upwardly facing shoulder 37 surrounding the lower end of the extension 35. Lower collar 30 has a short downwardly extending sleeve portion 38 externally threaded at 39 to which is threadedly connected a latch sleeve 40. The latter is provided in the wall thereof with an elongate slot 41 closed at both ends, which is adapted to slidably receive a lug 42 secured to and projecting radially from the upper end of extension 35. With latch sleeve 40 secured to extension sleeve 38, as illustrated in full lines in Fig. 5F, it will be seen that expander cone 27 will be held upwardly out of engagement with slips 33, as seen in Fig. 5E. By rotating the body of the testing tool, drag springs 31 holding the slips against rotation by engagement with the pipe wall, it will be seen that latch sleeve 40 may be unscrewed from sleeve extension 38 and by reason of the slidable connection formed between lug 42 and slot 41, latch sleeve 40 may drop down to the position shown in dotted lines in Fig. 5F, releasing the slip cone and slips for relative movement toward and away from each other, depending upon whether or not the tool body is raised or lowered, drag springs 31 holding the slips stationary while longitudinal movement of the tool body occurs.

Returning now to the upper end of the tool, as seen in Fig. 5A, upper section 20 is provided with a reduced diameter portion 43 forming an upwardly extending cylindrical extension thereof and having a threaded pin 44 at its upper end for the reception of the threaded socket 45 provided in the lower end of head section 16.

As best seen in Fig. 5B, upper body section 20 comprises upper and lower body portions 20a and 20b, respectively, connected together by means of a threaded pin 46 on the lower end of portion 20a which is received in a threaded box 47 provided in the upper end of portion 20b. Portion 20a is reduced in its external diameter at 48 to provide the downwardly facing annular shoulder 49, and lower portion 20b is also reduced in external diameter at 50, but to a lesser extent than portion 20a, to thereby provide the annular upper end face 51 on portion 20b, which is longitudinally spaced from shoulder 49, and the upwardly facing shoulder 52 below end face 51.

A spacer sleeve 53 is mounted about reduced diameter portion 48 and has at its upper end the annular flange 54 which is adapted to seat against shoulder 49, the lower face of flange 54 forming the downwardly facing shoulder 55. The lower end of sleeve 53 terminates at a point above upper end face 51 of portion 20b. An annular seal ring 56, constructed of rubber or other similar flexible resilient material, is mounted on spacer sleeve 53 intermediate its ends and bears against a cam ring 57 having at its upper end an upwardly and inwardly tapering conical face 58 which, in turn, bears against the lower end of a barrier ring 59, the upper end of which is seated against shoulder 55. Barrier ring 59 is composed of a plurality of complementary circular segments (Fig. 8) which, when fully retracted, form a substantially solid ring, but which will expand radially under thrust applied against the lower end face 60 of the ring, which is tapered to complement that of end face 58 of the cam ring. Garter springs 61, constructed of rubber or coiled wire, surround barrier ring 59 to normally urge the segments thereof inwardly to a position flush with the outer surface of body section 20, the garter springs serving also to prevent the segments of the barrier ring from becoming dislodged from their positions between shoulder 55 and cam ring 57. A plunger 62 is slidably mounted about the exterior of reduced diameter portion 48, the upper end of the plunger bearing against the lower end of seal ring 56 and extending about the lower end portion of spacer sleeve 53. Slidable seals are formed between the overlapping ends of plunger 62 and sleeve 53 by means of O-rings 63. Plunger 62 has threadedly secured to the lower end thereof an extension sleeve 64 which is slidable about reduced diameter portion 50, the lower end of extension sleeve 64 being adapted to seat on shoulder 52 when the plunger is in the inactive position, shown in Fig. 5B. A slidable seal is provided between the exterior of reduced diameter portion 50 and extension sleeve 64 by means of the O-ring seals 65. Plunger 62 has an internal annular enlargement forming an annular piston 66 surrounding reduced diameter portion 48 and having its lower end spaced somewhat above end face 51. A slidable seal is formed between piston 66 and the exterior of reduced diameter portion 48 by means of the O-rings 67. The spacing of piston 66 from end face 51 forms a chamber or cylinder 68 into which pressure fluid may be introduced in order to urge plunger 62 upwardly relative to end face 51, as will be more fully described hereinafter. A leak channel 69 is cut longitudinally along the surface of reduced diameter portion 48 communicating at one end with the portion of cylinder 68, defined between piston 66 and the lower end of spacer sleeve 53. At its upper end leak passage 69 communicates with a circular passage 70 formed at the upper end of flange 54 and communicating with a plurality of radial vent passages 71 (Figs. 5B and 10) opening to the exterior of body section 20.

Upper body section 20a has an axial bore 72 which extends throughout its length from the upper end of extension 43 to the lower end of pin member 46. A radial inlet port 73 (Fig. 5A) extends through the wall of extension 43 at a point below its upper end and communicates with bore 72. A discharge port 74 extends through the wall of reduced diameter portion 48 at a point just above threaded pin 46 and provides communication between bore 72 and cylinder 68 (Fig. 5B). Concentrically positioned in bore 72 and extending throughout the length of the bore from end to end thereof, is a tube 75, the opposite ends of the tube being welded securely to the ends of pin members 44 and 46, respectively. The external diameter of tube 75 is substantially smaller than the diameter of bore 72 to provide the annular space 72a therebetween. Filler rings 76 and 77 are positioned in bore 72 surrounding the upper and lower end portions, respectively, of tube 75 to close off annular space 72a at its opposite ends. The closure thus formed about the upper end portion of tube 75 is positioned above the point of entrance of port 73 into bore 72, thus preventing communication between bore 72 and the interior of tube 75. Socket 45 in head 16 is provided with a port 78 which communicates with the interior of socket 45 and thence with the interior of tube 75. The bottom of box 47 is provided with an outlet port 79 opening to the exterior of body portion 20b and which is adapted to communicate at its inner end with the lower end of tube 75 when pin member 46 is inserted into box 47, as shown particularly in Fig. 5B.

The lower end of body portion 20b is provided with an externally threaded pin member 80 which is adapted to be received into an internally threaded socket 81 provided at the upper end of connector section 21, the latter having an axial passage 82 extending entirely therethrough into communication with an axial bore 83 provided in lower body section 22 (Fig. 5C). A longitudinal channel 84 is provided in the exterior of pin member 46 which communicates with discharge port 74 at its upper end and at its lower end with a channel 84a which extends through pin member 80 and communicates with the interior of box 81 and thence with bore 82.

Lower body section 22, as seen in Fig. 5C, is constructed very much like upper body section 20, comprising the upper portion 22a and lower portion 22b. Upper portion 22a has two successively reduced diameter portions 86 and 87 defining the longitudinally spaced downwardly facing shoulders 88 and 89. Reduced diameter portion 87 terminates in a threaded pin 90 which is received in a tubular socket or box 91 defined by a reduced diameter portion 92 formed on lower body portion 22b to provide at its lower end the upwardly facing shoulder 93 and at its upper end the end face 94. An annular seal ring 95 is mounted about reduced diameter portion 92. The lower end of seal ring 95 bears against a cam ring 96 which, in turn, engages the tapered upper end of a segmented barrier ring 97 which is seated against shoulder 93. Seal ring 95, cam ring 96, and barrier ring 97 are substantially identical in construction and function to seal ring 56, cam ring 57 and barrier ring 59 of the upper seal member. A compression sleeve or plunger 98 has its lower end slidably extending over the upper end of reduced diameter portion 92 and engages the upper end of seal ring 95. A slidable seal is formed between the engaging surfaces of reduced diameter portion 92 and plunger 98 by means of the O-rings 99. The upper end of plunger 98 has secured thereto the extension sleeve 100 which slidably extends about reduced diameter portion 86 and seats against shoulder 88. A slidable seal is provided between reduced diameter portion 86 and the interior wall of extension 100 by means of the O-rings 101. Sleeve plunger 98 carries the internal annular enlragement forming the piston 102 which is slidably sealed with the surface of reduced diameter portion 87 by means of the O-rings 103 and is spaced below shoulder 89 to form the cylinder 104 between shoulder 89 and the upper end of piston 102. A pressure fluid supply port 105 extends through the wall of reduced portion 87 providing communication between cylinder 104 and a terminal portion 83a of bore 83. A relief passage 106 extends longitudinally through pin member 90 communicating at its upper end with the portion of cylinder 104 which lies between the seals 99 and 103 and at its opposite end with a vent passage 107 which opens to the exterior of body section 22.

Inlet port 73, bore 72 (annular space 72a), port 74, channels 84 and 84a, bores 82 and 83, terminal portion 83a, and port 105, together, constitute a first conduit means extending through the body of the tool and communicating with both seal elements and constitutes the means by which pressure fluid may be supplied to both the upper and lower seal elements for effecting expansion of the seal rings 56 and 95. Port 78, tube 75, and outlet port 79 constitute a second independent conduit means extending through the body and the upper seal element and opening into the space in the well pipe between the two seal elements, by which pressure fluid may be introduced into the well pipe between the two seal elements to pressure test the sealed-off section of the pipe.

Figure 6:
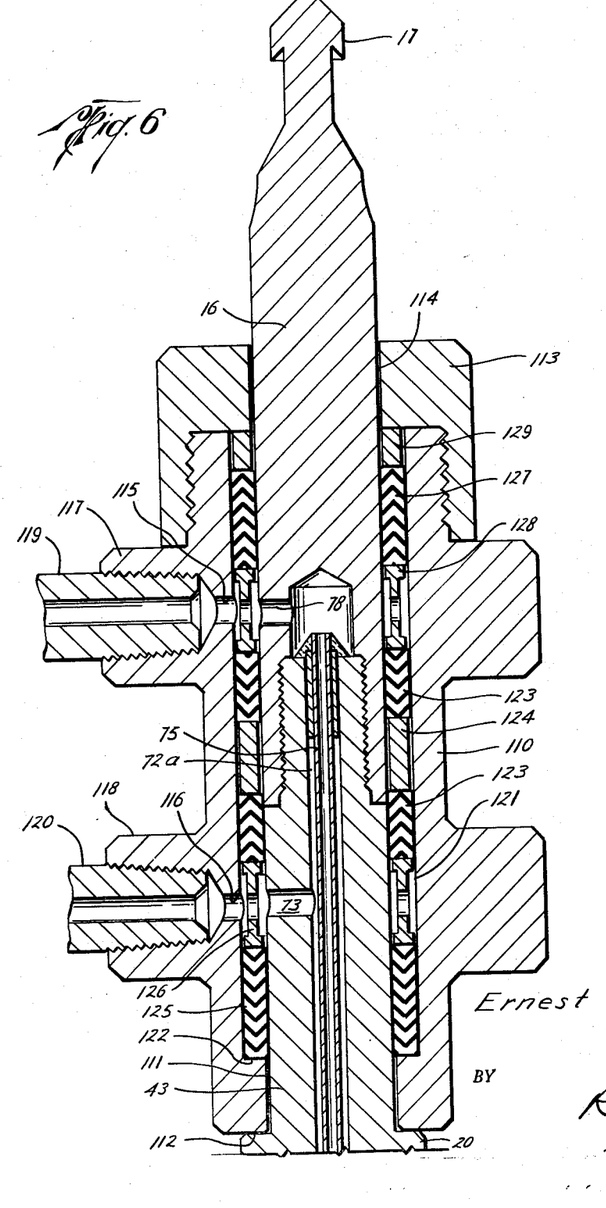
Fig. 6 is a longitudinal sectional view of the upper end of the tool showing the pressure fluid supply connector applied to the tool.

The means for supplying pressure fluid to both the aforementioned conduit means is shown in detail in Fig. 6. This pressure fluid means comprises the tubular sleeve 110 having the axial through bore 111 which is adapted to permit sleeve 110 to be installed about extension 43 by sliding it over head 16, and seating it against the upwardly facing shoulder 112 formed by reduction in diameter of upper body section 20 in providing extension 43. The upper end of sleeve 110 is closed by a threadedly connected cap 113 having an axial opening 114 to slidably receive the upper end portion of head 16.

Sleeve 110 is provided with a pair of longitudinally spaced upper and lower inlet ports 115 and 116, respectively, adapted to register, respectively, with ports 78 and 73 when sleeve 110 is mounted about extension 43 and seated on shoulder 112. Ports 115 and 116 communicate with internally threaded bosses 117 and 118, respectively, to which are threadedly connected the pressure fluid supply pipes 119 and 120, respectively, which lead to a source of supply of pressurized testing fluid, preferably water (not shown), which may be a common supply source for both pipes 119 and 120, the pressure being supplied by suitable and generally conventional pumping means (not shown).

Bore 111 is enlarged from its upper end to provide a stuffing box 121 extending from the upper end of sleeve 110 to a point adjacent the lower end of sleeve 110 where the enlargement of bore 111 provides an upwardly facing shoulder 122 which forms the bottom of the stuffing box.

Several sets of annular packing are installed in stuffing box 121, packings 123—123 being installed between ports 73 and 78 and separated by a spacer ring 124. The packings 123 serve to seal off communication between the streams of pressure fluid entering ports 73 and 78. A packing 125 is installed between port 73 and shoulder 122 and is spaced from packing 123 by means of a perforate spacer ring 126 which is positioned to permit communication between ports 116 and 73, packing 125 serving to prevent leakage through bore 111. A packing 127 is installed above port 78 to seal against leakage of fluid through the upper end of sleeve 110 and is spaced from packing 123 by perforate spacer ring 128 positioned to permit communication between ports 115 and 78. A compression ring 129 is positioned in the stuffing box on the upper end of packing 127 and serves as a packing gland which is urged against the set of superimposed packings by cap 113 when the latter is screwed down about the upper end of sleeve 110, to thereby tighten the seals between sleeve 110 and extension 43 on opposite sides of the respective supply ports. Supply pipes 119 and 120 are connected by means of flexible tubes 130 and 131, respectively (Fig. 4), to a suitably valved pipe manifold 132 which connects to the pressure fluid supply source and the pressurizing pumps (not shown). The valves 133 and 134 serve to control the flow of pressure fluid to supply pipes 119 and 120, respectively.

By providing the flexible connections between the supply header and sleeve 110, the latter may be readily slipped on and off over head 16, as required during operation of the testing device.

The above described device is employed in testing a pipe string as it is being run in the well in a manner substantially as follows, reference being had particularly to Figs. 1 to 4 in connection with the description of the stages of operation. In Fig. 1, the testing tool is shown in the position corresponding to that at which it has just completed the testing of pipe section P₂, and a new section P₃ carrying the collar C₃ at its upper end, has been connected to collar C₂ preparatory to lowering the pipe string into the well to accommodate the added section P₃. At this stage of operation supply sleeve 110 has been removed from head 16 and no pressure is being applied to the seal elements; hence, the latter are in their retracted positions, as best seen in Fig. 5B, and the tool is sitting in slips 33 which are anchored in pipe section P₁, latch sleeve 40 having been released, as previously described, to release cone 27 for engaging and expanding slips 33 into anchoring engagement with the pipe wall. Cup seal 24 serves at all times the function of preventing up-flows of liquid, which is ordinarily present in the pipe string, past the cup seal, it being understood that the pressure of such fluid from below will serve to expand skirt 25 and seal against upward passage of fluid.

The pipe string is then lowered, as seen in Fig. 2, carrying the testing tool downwardly into the well bore until the upper end of section P₃ has been lowered to the desired extent and anchored at the top of the well. Grapple G will then be lowered into the bore of the pipe string and will grasp spear 17 (Fig. 3) and draw the tool upwardly through the pipe string to the position at which seal elements 12 and 13 are in position to test the newly added pipe section. The upward pull thus applied will lift cone 27 out of the slips, thereby releasing the anchor and enabling the tool to be pulled upwardly to the position mentioned. Thereafter, the tool is lowered slightly to re-set the slips and anchor the tool in the new testing position, as seen in Fig. 3.

Figures 3, 4:
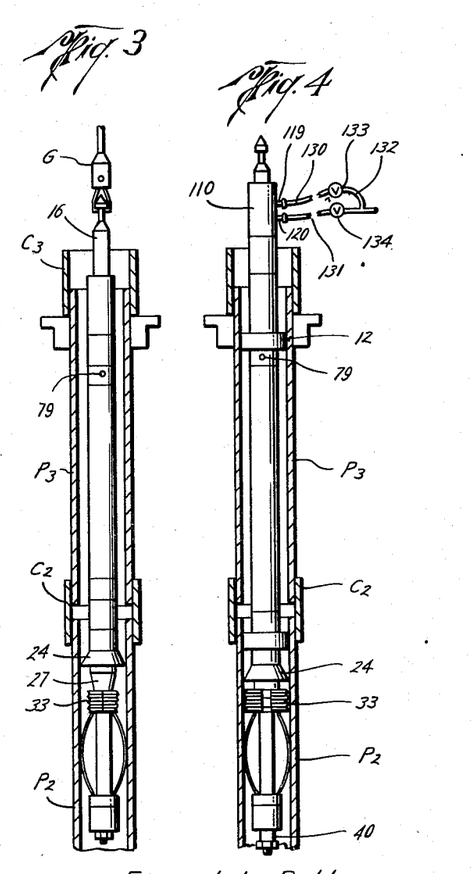

When the tool is moved to its new testing position, head 16 will extend above the upper end of the added section P₃, and sleeve 110, with its pressure fluid supply connections, will then be installed over head 16 and pressure fluid introduced first through pipe 120 and thence through ports 116 and 73 into annular space 72a (Fig. 4). The pressure fluid thus supplied will flow through the first conduit means, a portion passing through port 74 and into cylinder 68 of the upper seal element to exert fluid pressure against plunger 62. A portion of the pressure fluid will continue through channels 84 and 84a, bore 82 and extension 83a, through port 105 into cylinder 104 where it will exert pressure against the upper end of plunger 98.

Figures 7, 8, 9, 10:
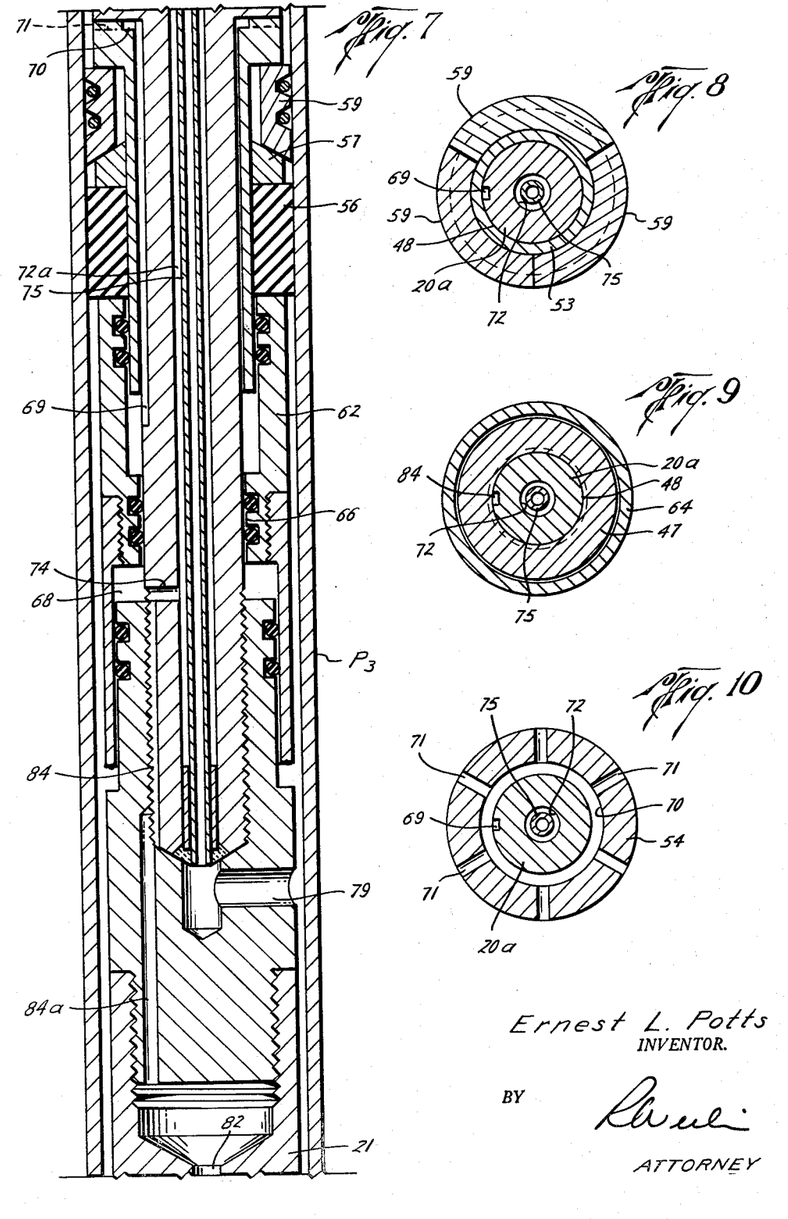
Fig. 7 is a longitudinal sectional view of the upper sealing element showing the positions of the parts thereof when in active sealing position.
Figs. 8, 9 and 10 are cross-sectional views taken respectively on lines 8—8, 9—9 and 10—10 of Fig. 5B.

The pressure of the fluid thus exerted in cylinders 68 and 104 will urge the plungers toward the respective seal rings 56 and 95 causing the latter to expand radially to the positions best seen in Fig. 7 and as also illustrated schematically in Fig. 4. The pressure thus exerted on the seal rings will act through the respective cam rings 57 and 96 to expand the adjacent barrier rings 59 and 97, respectively, the barrier rings segments being thereby caused to move outwardly against the pipe wall and forming a dam or barrier which will effectively prevent extrusion or cold flow of the seal ring material under the testing pressures to be applied thereto. As soon as the seal rings are thus actuated, fluid flow to the cylinders 68 and 104 will be effectively stopped. At the same time, pressure fluid will be introduced through supply pipe 119 into the second conduit means constituting tube 75. This pressure fluid will discharge through port 79 into the annular space inside the pipe section between the seals formed by the expanded seal rings 56 and 95. Fluid pressure of any desired magnitude may thus be applied to effectively test the sealed-off section of the pipe.

It will be understood that pressure fluid may be introduced simultaneously to the first and second conduit means, since the discharge area of tube 75 will ordinarily be made less than the areas of ports 74 and 105 so that the lesser discharge area of tube 75 will act as a choke causing the incoming pressure fluid to be initially directed to cylinders 68 and 104, and when resistance to further introduction of fluid into the cylinders occurs as by full expansion of the seal rings, fluid will then flow through port 79 and build up the pressure in the space between the seals. Leak channels 69, 70 and 71 in the upper seal unit and leak channels 106 and 107 in the lower seal unit serve to vent any fluid trapped in the portions of the cylinders between O-ring seals 63 and 67 in the case of the upper seal unit, and O-ring seals 99 and 103 in the case of the lower seal unit, so as not to interfere with the compressive movement of plungers 62 and 98.

To release the tool for movement to the next testing position, the flow of pressure fluid is cut off relieving the pressure in cylinders 68 and 104, and sleeve 110 is pulled off the upper end of the testing tool. Relief of the pressure fluid will thus allow the seal units to retract to their initial positions and the tool will again be in the position shown in Fig. 1, preparatory to the addition of a new section of pipe, such as P₃, and the cycle of operations previously described will be repeated.

It will be noted that in this sequence of operations, the upward movement of the testing tool from a lower position to a higher position occurs after the seal rings have been retracted; hence, these do not engage the wall of the pipe as the tool is drawn upwardly and are not thereby subject to the wear incident to the operation of more conventional forms of pressure testing tools.

When the flow of pressure fluid has been cut off and the seal rings retracted, as the tool is drawn upwardly in the well to its testing position any pressure fluid thus introduced into the bore of the pipe under test will simply flow past cup seal 24 and raise the liquid level in the pipe string proportionately. As a matter of fact, in the usual operations with the present tool, as the pipe string is lowered in the well after addition of a pipe section, fluid will rise inside the pipe string and the rising level of fluid will exert an upward pressure on cup seal 24 and thereby push the tool upwardly in the pipe string as the latter is lowered, thereby largely obviating the need to employ the grapple G for purposes of drawing the tool upwardly into the well. As a result, the lifting of the tool becomes substantially automatic in many instances as the additional pipe sections are added.

It will be understood that various changes and modifications may be made in the details of the illustrative embodiment within the scope of the appended claims but without departing from the spirit of the invention.

What I claim and desire to secure by Letters Patent is:

1. A pipe tester, comprising, an elongate body insertible in a pipe string, spaced apart upper and lower seal means mounted on the body, each of said seal means including a radially expandible resilient seal member and seal-expanding means actuatable by fluid pressure to radially expand said seal member into sealing engagement with said pipe string whereby to seal off a section thereof, anchor means carried by the body operable to releasably anchor the body in the pipe string, a first conduit means extending through said body and communicating with both said seal-expanding means for supplying actuating pressure fluid thereto, a second conduit means extending through said body and said upper seal means and opening into the space between the seal means, and means for supplying pressure fluid to both said conduit means.

2. A pipe tester, comprising, an elongate body insertible in a pipe string, spaced apart upper and lower seal means mounted on the body, each of said seal means including a radially expandible resilient seal member and seal-expanding means actuatable by fluid pressure to radially expand the seal member into sealing engagement with said pipe string whereby to seal off a section of the pipe string, anchor means carried by the body operable to releasably anchor the body in the pipe string, a first conduit means extending through said body and communicating with both said seal-expanding means for supplying actuating pressure fluid thereto, a second conduit means extending through said body and said upper seal means and opening into the space between the seal means, and coupling means detachably connectible to the upper end portion of the body and having pressure fluid supply passages positioned to communicate separately with said first and second conduit means.

3. A pipe tester, comprising, an elongate body insertible in a pipe string, spaced apart upper and lower seal means mounted on the body, each of said seal means including a radially expandible resilient seal member and seal-expanding means actuatable by fluid pressure to radially expand said seal member into sealing engagement with said pipe string whereby to seal off a section thereof, anchor means carried by the body operable to releasably anchor the body in the pipe string, a first conduit means extending through said body and communicating with both said seal-expanding means for supplying actuating pressure fluid thereto, a second conduit means concentrically disposed within said first conduit means to extend therewith through said upper seal means and opening into the space between the seal means, and means for supplying pressure fluid to both said conduit means.

4. A pipe tester, comprising, an elongate body insertible in a pipe string, spaced apart upper and lower seal means mounted on the body and adapted to seal off a section of the pipe string, each of said seal means including an annular resilient seal member and plunger means slidably mounted on the body and actuatable by fluid pressure to axially compress and thereby radially expand said seal member into sealing engagement with said pipe, said plunger means comprising a sleeve member defining a pressure fluid-receiving cylinder about said body, port means in the body communicating with said cylinders, slip-type anchor means carried by the body operable to releasably anchor the body in the pipe string, a first conduit means extending through said body and communicating with said port means for supplying actuating pressure fluid to both of the plunger means, a second conduit means extending through said body and said upper seal means and opening into the space between the seal means, and means for supplying fluid pressure to both said conduit means.

5. A pipe tester, comprising, an elongate body insertible in a pipe string, spaced apart upper and lower seal means mounted on the body and adapted to seal off a section of the pipe string, each of said seal means including an annular resilient seal member and plunger means slidably mounted on the body and actuatable by fluid pressure to axially compress and thereby radially expand said seal member into sealing engagement with said pipe, said plunger means comprising a sleeve member having a pair of longitudinally spaced seal elements slidably engaged with the exterior of the body and defining therebetween a pressure fluid-receiving cylinder, port means in the body communicating with said cylinders, slip-type anchor means carried by the body operable to releasably anchor the body in the pipe string, a first conduit means extending through said body and communicating with said port means for supplying actuating pressure fluid to both of the plunger means, a second conduit means extending through said body and said upper seal means and opening into the space between the seal means, and means for supplying fluid pressure to both said conduits.

6. A pipe tester, comprising, an elongate body insertible in a pipe string, spaced apart upper and lower seal means mounted on the body, each of said seal means including a radially expandible resilient seal member and seal-expanding means actuatable by fluid pressure to radially expand said seal member into sealing engagement with said pipe string whereby to seal off a section thereof, anchor means carried by the body operable to releasably anchor the body in the pipe string, a first conduit means extending through said body and communicating with both said seal-expanding means for supplying actuating pressure fluid thereto, a second conduit means extending through said body and said upper seal means and opening into the space between the seal means, and means for supplying pressure fluid to both said conduits, and a downwardly opening flexible cup seal mounted on the body below the lower seal means.

7. A pipe tester, comprising, an elongate body insertible in a pipe string, spaced apart upper and lower seal means mounted on the body and adapted to seal off a section of the pipe string, each of said seal means including an annular resilient seal member and plunger means slidably mounted on the body in engagement with one end of said seal member, a segmented barrier ring about the body and engaged by the opposite end of said seal member, said plunger means being actuatable by fluid pressure to axially compress and thereby radially expand said seal member and said barrier ring into sealing engagement with said pipe, slip-type anchor means carried by the body operable to releasably anchor the body in the pipe string, a first conduit means extending through said body and communicating with both said seal means for supplying actuating pressure fluid to said plunger means, a second conduit means extending through said body and said upper seal means and opening into the space between the seal means, and means for supplying fluid pressure to both said conduit means.

8. A pipe tester, comprising, an elongate body insertible in a pipe string, spaced apart upper and lower seal means mounted on the body, each of said seal means including a radially expandible resilient seal member and seal-expanding means actuatable by fluid pressure to radially expand said seal member into sealing engagement with said pipe string whereby to seal off a section thereof, a first conduit means extending through said body and communicating with both said seal-expanding means for supplying actuating pressure fluid thereto, a second conduit means extending through said body and said upper seal means and opening into the space between the seal means, and means for supplying pressure fluid to both said conduit means.

9. A pipe tester, comprising, an elongate body insertible in a pipe string, spaced apart upper and lower seal means mounted on the body and adapted to seal off a section of a pipe string, each of said seal means including an annular resilient seal member and plunger means slidably mounted on the body and actuatable by fluid pressure to axially compress and thereby radially expand said seal members into sealing engagement with said pipe string, each of said plunger means comprising a sleeve member having one end engaging said seal member, seal elements interiorly of the sleeve member spaced from said one end and slidably sealing about the exterior of the body, the portions of said sleeve member between said seal elements and the end of the sleeve member opposite said one end defining a pressure fluid-receiving cylinder about said body, passage means in the body communicating the interiors of the sleeve members between said seal elements and the seal members with the exterior of the body above and below the respective seal members, port means in the body communicating with said cylinders, a first conduit means extending through said body and communicating with said port means for supplying actuating pressure fluid to both said plunger means, a second conduit means extending through said body and said upper seal means and opening into the space between the seal means, and means for supplying fluid pressure to both said conduit means.

References Cited in the file of this patent

UNITED STATES PATENTS

| | | |
|---|---|---|
| 1,796,454 | Granger | Mar. 17, 1931 |
| 2,652,717 | Bush et al. | Sept. 22, 1953 |
| 2,715,444 | Fewel | Aug. 16, 1955 |
| 2,731,827 | Loomis | Jan. 24, 1956 |
| 2,767,795 | Bush | Oct. 23, 1956 |
| 2,793,524 | Badger | May 28, 1957 |
| 2,841,007 | Loomis | July 1, 1958 |